United States Patent Office 3,720,664
Patented Mar. 13, 1973

3,720,664
α-UREIDOCYCLOHEXADIENYLALKYLENE-
PENICILLINS
Raymond Curry Erickson, Metuchen, N.J., assignor to
E. R. Squibb & Sons, Inc., New York, N.Y.
No Drawing. Filed Nov. 17, 1969, Ser. No. 877,478
Int. Cl. C07d 99/16
U.S. Cl. 260—239.1    6 Claims

ABSTRACT OF THE DISCLOSURE

This invention relates to α-ureidocyclohexadienylalkylene-penicillins as well as their salts and compositions containing them, which are useful as antibacterial agents.

SUMMARY OF THE INVENTION

This invention relates to α-ureido-1,4-cyclohexadienyl-alkylene-penicillins of the formula
(I)

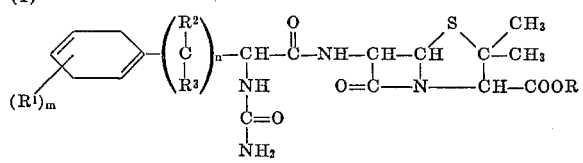

and to salts thereof, wherein R is hydrogen, lower alkyl or a salt forming ion, e.g., an alkali metal as sodium or potassium, an alkaline earth metal like calcium or magnesium, or that of an organic base like an alkylamine, dibenzylamine, N,N-dibenzylethylenediamine or the like.

$R^1$ represents hydrogen, lower alkyl or lower alkoxy,
$R^2$ and $R^3$ each represents hydrogen or lower alkyl,
$m$ represents 1 or 2,
$n$ represents 0, 1, 2, 3 or 4.

The lower alkyl and lower alkoxy groups in the above formulas include straight and branched chain radicals of one to seven carbons such as methyl, ethyl, propyl, isopropyl, butyl, isobutyl, t-butyl, amyl, methoxy, ethoxy, propoxy, isopropoxy and the like.

Preferred are those compounds wherein $R^1$, $R^2$ and $R^3$ are all hydrogen and $n$ is 0 or 1 especially 0.

Except where otherwise indicated, the symbols in the foregoing formulas and those which follow all have the meaning defined above.

The new compounds of Formula I may be prepared by coupling a cyclohexadienyl-α-aminoalkanoic acid, having the formula
(II)

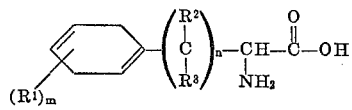

with a 6-aminopenicillanic (6-APA) compound of the formula
(III)

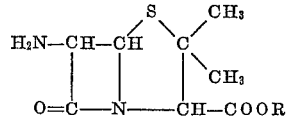

For an efficient process, an activated form of the compound of Formula II is used. The amino group is best protected before coupling. Protecting groups which may be used to protect the amino group during the reaction of the acid compound with the 6-APA compound include, for example, triphenylmethyl, t-butoxycarbonyl, β,β,β-trichloroethoxycarbonyl, 4-oxo-2-pentenyl-2, 1-carbomethoxy-1-propenyl-2 or the like. These are formed by reacting the acid of Formula II with a compound such as triphenylmethylchloride, t-butyl azidoformate, β,β,β-trichloroethyl chloroformate, acetylacetone, methylacetoacetate or the like. After the coupling reaction, if the protecting group is still present, it is removed, e.g., by treatment with aqueous acetic acid, trifluoroacetic acid, zinc-acetic acid, or aqueous mineral acid, respectively, to give the compound with the free or mono-substituted amino group.

Alternatively the amino group may be protected by protonation as the salt form before and during the subsequent coupling reaction.

The compound of Formula III may also be in the form of derivatives like aldimines or Schiff's bases formed with the amino groups. Such derivatives are frequently useful as starting materials or intermediates by virtue of their stability and, in many cases, increased yields and more uniform reaction.

The coupling is preferably effected by conversion of the acid to an activated form such as the acid chloride, bromide, azide, p-nitrophenyl ester or mixed anhydride, or by condensing in the presence of a carbodiimide such as dicyclohexylcarbodiimide.

The product of this reaction having the formula
(IV)

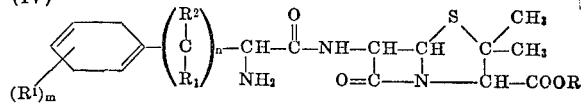

is treated with a cyanate, e.g., an alkali metal cyanate, or with carbamyl phosphate to obtain the product of Formula I. This is accomplished by dissolving or suspending the compound of the above formula in aqueous medium and the cyanate or carbamyl phosphate is slowly added. Heat, e.g., up to about 80° C., may be applied to accelerate the reaction. The pH of the reaction mixture is preferably maintained in the acid range, e.g., about 5 to 6.9. The product may usually be precipitated by acidification and chilling.

As an alternative, the compound of Formula II may first be reacted with the cyanate or carbamyl phosphate under the conditions described above to obtain an intermediate of the formula
(V)

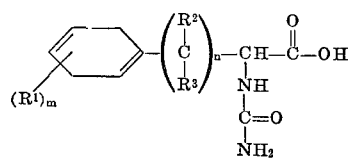

This compound or the derivatives described above are then reacted with the compound of Formula III or its derivative to obtain the same final product.

The starting materials of Formula II may be prepared by reducing a compound of the formula
(VI)

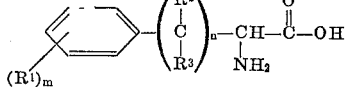

or a metal salt thereof, e.g., alkali metal salt, alkaline earth metal salt or the like, with sodium or lithium in liquid ammonia followed by treatment with an alcohol such as ethanol, t-butanol, followed by treatment with ammonium chloride, or other amine hydrochloride.

The products of this invention form salts which are also part of the invention. Basic salts form with the acid moiety as discussed above in connection with the symbol R.

It will be appreciated that certain of the compounds of this invention exist in various states of solvation as well as in different optically active forms. The various forms as well as their mixtures are within the scope of this invention. Ordinarily the new penicillin derived from the D-form of the amino acid is more active than that derived from the L-form or the DL-form.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes.* They may be used as antibacterial agents in a prophylactic manner, e.g., in cleaning or disinfecting compositions, or otherwise to combat infections due to organisms such as those named above, and in general may be utilized in a manner similar to penicillin G and other penicillins. For example, a compound of Formula I or a physiologically acceptable salt thereof may be used in various animal species in an amount of about 1 to 200 mg./kg. daily, orally or parenterally, in single or two to four divided doses to treat infections of bacterial origin. By way of illustration, the $PD_{50}$ orally in mice in a single administration is of the order of 5.0 mg./kg. against Streptococcus. The products of this invention are particularly effective against hard to control species of Pseudomonas, preferably administered subcutaneously.

Up to about 600 mg. of a compound of Formula I or a physiologically acceptable salt thereof may be incorporated in an oral dosage form such as tablets, capsules or elixirs or in an injectable form in a sterile aqueous vehicle prepared according to conventional pharmaceutical practice.

In cleansing or disinfecting compositions, e.g., in barns or dairy equipment, a concentration of about 0.01 to 1% by weight of such compounds admixed with, suspended or dissolved in conventional inert dry or aqueous carriers for application by washing or spraying may be used. They are also useful as nutritional supplements in animal feeds.

The following examples are illustrative of the invention. All temperatures are on the centigrade scale.

GENERAL PROCEDURE (1) 1,4-cyclohexadienyl-α-aminoalkanoic acid

A solution of 72.7 mmole of α-amino aryl alkanoic acid in 900 ml. distilled ammonia (which has been treated with 45 mg. lithium after distillation to destroy traces of moisture) is slowly diluted with 360 ml. dry t-butyl alcohol.

Over a period of 2 hours, 1.65 g. lithium (3.27 eq.) is added in small portions until a permanent blue color is obtained. The blue reaction mixture is then treated with 38 g. of triethylamine hydrochloride. The ammonia is allowed to evaporate at room temperature overnight and the residual solvent is evaporated at reduced pressure. The white residue is taken up in a small amount of methanol-water and added to 4 l. of cold 1:1 chloroform acetone to precipitate the crude product. After 20 minutes stirring the suspension is filtered and the white filter cake dried in vacuo; the filter cake is then pulverized and submitted once more to the precipitation process from 1:1 chloroform-acetone.

The crystalline product is obtained in high yield and purity but is slightly contaminated with lithium chloride, about 1% chlorine being found by typical analysis. The material may be used directly.

(2) Methyl acetoacetate enamine of α-amino-ω-(1,4-cyclohexadienyl)alkanoic acid sodium salt 2.00 mmoles of 1,4-cyclohexadienyl-α-aminoalkanoic acid is dissolved by warming a solution of 108 mg. of sodium methoxide (2.00 mmoles) in 4.3 ml. reagent grade methanol. 255 mg. (.24 ml.–2.20 mmoles) methyl acetoacetate is added and the mixture refluxed for 45 minutes. The methanol is almost totally stripped off in vacuo. 5 ml. benzene is added and distilled off to a small residual volume. The addition and distillation of benzene is repeated to insure complete removal of the methanol and water. The product crystallizes out overnight from a small residual volume of benzene; the amorphous powder obtained from benzene is quite satisfactory for further use.

(3) α-amino-ω-(1,4-cyclohexadienyl)alkylpenicillin 358 mg. 6-aminopenicillanic acid (1.66 mmoles) are stirred well in 2.5 ml. water while 0.23 ml. triethylamine are gradually added with the pH kept under 8.0. Final pH is 7.4; 0.85 ml. acetone are added and the solution kept at −10° C.

1.66 mmoles of methyl acetoacetate enamine of α-amino-ω-(1,4-cyclohexadienyl)alkanoic acid, sodium salt are stirred in 4.25 ml. acetone at −20° C. A microdrop of N-methyl-morpholine is added followed by the slow addition of 198 mg. of ice cold ethyl chloroformate. Water, 0.43 ml. is added at this point and a turbid solution results. The reaction is stirred for 10 minutes at −20° C.

The turbid solution of mixed anhydride is then added to the 6–APA solution. A complete solution is observed. The solution is stirred for 30 minutes at −10° C. It is then raised to room temperature and acidified to pH 2.0 with diluted HCl and, with good stirring, the pH is kept at that level for 10 minutes.

The solution is then extracted with 5 ml. xylene. The aqueous layer is layered with 5 ml. methyl isobutyl ketone and the pH adjusted to 5.0 with 1 N sodium hydroxide and chilled overnight. The resulting crystals are filtered off, washed with water, and air dried; alternatively, the aqueous layer may be lyophilized, and the product obtained as a mixture with salt may be used directly or purified by crystallization from aqueous alcohol.

(4) α-Ureido-ω-(1,4-cyclohexadienyl)alkyl pencillin

A suspension containing 300 mg. of the product of part 3 in about 7 to 10 ml. of water is prepared. 600 mg. of potassium cyanate are added with stirring. The reaction mixture is kept for about five hours at about 22°–25° C. and the pH is maintained between 5.0 and 6.9 by the addition of 6 N hydrochloric acid. The solution is chilled and acidified to pH 1.9–2.0 with 2 N hydrochloric acid. The product which precipitates is filtered, washed with cold water and dried.

EXAMPLE 1

(a) D-2-amino-2-(1,4-cyclohexadienyl)acetic acid

A solution of 11.0 g. (72.7 mmoles) of D-phenylglycine in 900 ml. distilled ammonia (which has been treated with 45 mg. lithium after distillation to destroy traces of moisture) is slowly diluted with 370 ml. dry t-butyl alcohol.

Over a period of 2 hours, 1.65 g. lithium (3.27 eq.) is added in small portions until a permanent blue color is obtained. The blue reaction mixture is then treated with 38 g. of triethylamine hydrochloride. The ammonia is allowed to evaporate at room temperature overnight and the residual solvent is evaporated at reduced pressure. The white residue is taken up in a small amount of methanol-water and added to 4 liters of cold 1:1 chloroform acetone to precipitate the crude product. After 20 minutes stirring the suspension is filtered and the white filter cake dried in vacuo; the filter cake is then pulverized and submitted once more to the precipitation process from 1:1 chloroform-acetone.

The white, crystalline product, 11.8 g., M.P. 297° (d), $[\alpha]_D$ −89.7° (2 N NaOH) is quantitatively obtained but is slightly contaminated with lithium chloride, 0.6% ionic chlorine being found by analysis.

(b) Methyl acetoacetic ester enamine of N-2-amino-2-(1,4-cyclohexadienyl)acetic acid sodium salt 306 mg. D-2-amino-2-(1,4-cyclohexadienyl)acetic acid (2.00 mmoles) are dissolved by warming in a solution of 108 mg. of sodium methoxide (2.00 mmoles) in 4.3 ml. reagent grade methanol. 255 mg. (.24 ml.–2.20 mmoles) methyl acetoacetate are added and the mixture refluxed for 45 minutes. The methanol is almost totally stripped off in vacuo. 5 ml. benzene are added and distilled off to a small residual volume. The addition and distillation of benzene is repeated to insure complete removal of the methanol and water. The product crystallizes out overnight from a small residual volume of benzene. It is filtered off, washed with benzene, and dried in vacuo. Yield: 463 mg.

(c) 6-[D-α-amino-(1,4-cyclohexadien-1-yl)-acetamido] penicillanic acid 358 mg. of 6-aminopenicillanic acid (1.66 mmoles) are stirred well in 2.5 ml. of water while 0.23 ml. triethylamine are gradually added with the pH kept under 8.0. Final pH is 7.4; 0.85 ml. acetone are added and the solution kept at −10° C.

469 mg. methyl acetoacetate enamine of D-2-amino-2-(1,4-cyclohexadienyl)acetic acid sodium salt (1.715 mmoles) are stirred in 4.25 ml. acetone at −20° C. A microdrop of N-methylmorpholine is added followed by the slow addition of 198 mg. of ice cold ethyl chloroformate. Water, 0.43 ml. is added at this point and a turbid solution results. The reaction mixture is stirred for 10 minutes at −20° C.

The turbid solution of mixed anhydride is then added to the 6–APA solution. A complete solution is observed. The solution is stirred for 30 minutes at −10° C., then raised to room temperature, acidified to pH 2.0 with diluted HCl and, with good stirring, the pH is kept at that level for 10 minutes.

The solution is then extracted with 5 ml. xylene. The aqueous layer is layered with 5 ml. methyl isobutyl ketone and the pH adjusted to 5.0 with 1 N sodium hydroxide and chilled overnight. The resulting crystals of 6-[D-α-amino - (1,4 - cyclohexadien-1-yl)-acetamido]penicillanic acid hemihydrate are filtered off, washed with water and air dried, M.P. 202° C. (dec.)

(d) 6-[D-α-ureido-(1,4-cyclohexadien-1-yl)acetamido] penicillanic acid

To a suspension of 300 mg. 6-[D-α-amino-(1,4-cyclohexadien-1-yl)acetamido]penicillanic acid hemihydrate in 7.0 ml. of water there is added 600 mg. of potassium cyanate with stirring. The reaction mixture, which soon clears, is incubated at 22–24° C. and the pH maintained between 5.0 and 6.9 by frequent dropwise additions of 6.0 N hydrochloric acid with stirring. After five hours, the solution is chilled in an ice bath, acidified to pH 1.9 with 2.0 N hydrochloric acid, and the resulting precipitated product collected on a filter, washed with 10.0 ml. of cold water, and dried over calcium chloride in vacuo to yield 200 mg. of 6-[D-α-ureido-(1,4-cyclohexadien-1-yl)-acetamido]penicillanic acid monohydrate, M.P. 174° (dec.).

EXAMPLE 2

6-[D-α-ureido-(1,4-cyclohexadien-1-yl)-acetamido] penicillanic acid, potassium salt Following the procedure of Example 1, the precipitated and washed 6 - [D-α-ureido-(1,4-cyclohexadien-1-yl)acetamido]-penicillanic acid is suspended in 25 ml. of water and treated with an equivalent of aqueous potassium hydroxide (0.1 N) added with vigorous stirring. The solution is evaporated to dryness in vacuo at 25–30° C. to yield 235 mg. of the potassium salt. The product is 75% pure by iodometric assay and is further purified by crystallization from aqueous acetone. The sodium salt is formed in the same manner using sodium hydroxide solution.

EXAMPLE 3

6-[DL-2-ureido-3-(1,4-cyclohexadien-1-yl)propionamido] penicillanic acid, sodium salt (a) DL - 2 - amino-3-(1,4-cyclohexadienyl)propionic acid: 12.0 g. (72.7 mmoles) of DL-phenylalanine are substituted for the D-phenylglycine in the procedure of Example 1a. The DL - 2-amino-3-(1,4-cyclohexadien-1-yl)propionic acid is obtained as a white power.

(b) DL - 2-ureido-3-(1,4-cyclohexadien-1-yl)propionic acid: A suspension of 1.0 g. of DL-2-amino-3-(1,4-cyclohexadien-1-yl)propionic acid in 10.0 ml. of water is treated with 0.59 g. of potassium cyanate and heated at 80° C. with stirring until a clear solution develops. The solution is cooled, incubated at 24° C. for 18 hours and then acidified with 2.0 N hydrochloric acid to precipitate DL - 2 - ureido-3-(1,4-cyclohexadien-1-yl)propionic acid which is washed with cold water and dried over calcium chloride in vacuo.

(c) 6-[DL-2-ureido-3 - (1,4 - cyclohexadien - 1 - yl) propionamido]-penicillanic acid, sodium salt: A solution of 490 mg. of DL-2-ureido-3-(1,4-cyclohexadien - 1 - yl) propionic acid and 125 mg. of sodium bicarbonate in 50 ml. of water is treated with a solution of 950 mg. of dicyclohexylcarbodiimide in 200 ml. of acetone. After stirring for 15 minutes at 24° C., 500 mg. of 6-aminopenicillanic acid is added slowly while stirring is continued. The reaction mixture is set aside for 3 hours at 24° C. and occasionally stirred during this time. The acetone is removed by evaporation at 10–20° C. at reduced pressure and the precipitated dicyclohexylurea is removed from the aqueous solution by filtration. The aqueous solution is acidified to pH 2.0 with 2.0 N hydrochloric acid and extracted with 4×50 ml. of ethyl acetate. The ethyl acetate is washed with 4×10 ml. of water adjusted to pH 2.0 with hydrochloric acid, dried with sodium sulfate, filtered and evaporated at 10–20° C. by reduced pressure to give the free acid as an amorphous white powder. The sodium salt is obtained by adding an equivalent amount of aqueous 0.1 N sodium hydroxide to a solution of the crude acid in 95% ethanol and evaporating the solution to precipitate the purified product as the sodium salt.

By utilizing the methyl ester of 6-aminopenicillanic acid instead of the free acid in part b, the product is obtained in the form of the methyl ester.

EXAMPLE 4

(a) 4-2-amino-3-(4-methoxy-1,4-cyclohexadien-1-yl) propionic acid

By substituting 14.2 g. (72.7 mmole) of D-O-methyl-tyrosine for the phenyl glycine in the procedure of Example 1a, D-2-amino-3-(4-methoxy-1,4-cyclohexadien-1-yl)propionic acid is obtained as a white crystalline product, M.P. 227° C., $[\alpha]_D^{20}$ −50.2°.

(b) Methyl acetoacetic acid ester enamine of D-2-amino-3-(4-methoxy-1,4-cyclohexadien - 1 - yl)propionic acid sodium salt This product is obtained by substituting 390 mg. of D-2-amino-3-(4-methoxy-1,4-cyclohexadien - 1 - yl)propionic acid (2.00 mmole) in the procedure of Example 1b.

(c) 6-[D-amino-3-(4-methoxy-1,4-cyclohexadien-1-yl) propionamido]-penicillanic acid By substituting 543 mg. (1.71 mmole) of the product of part b in the procedure of Example 1c, 6-[D-2-amino-3-(4-methoxy-1,4-cyclohexadien - 1 - yl)propionamido] penicillanic acid is obtained.

(d) 6-[D-2-ureido-3-(4-methoxy-1,4-cyclohexadien-1 - yl) propionamido]-penicillanic acid By substituting the product of part c in the procedure of Example 1d, 6-[D-2-ureido-3-(4-methoxy-1,4-cyclohexadien - 1 - yl)propionamido]penicillanic acid is obtained.

EXAMPLE 5

6-[DL-2-ureido-(4-methoxy-1,4-cyclohexadien-1-yl) acetamido penicillanic acid

By substituting DL-4-methoxyphenylglycine for the phenylglycine in part a and otherwise following the procedure of Example 1 through part d, the above product is obtained.

EXAMPLE 6

6-[DL-2-ureido-(4-methyl-1,4-cyclohexadien-1-yl) acetamido]penicillanic acid

By substituting DL-4-methylphenylglycine for the phenylglycine in part a and otherwise following the procedure of Example 1 through part d, the above product is obtained.

EXAMPLE 7

6-[D-α-ureido-(1,4-cyclohexadien-1-yl)acetamido] penicillanic acid

To 420 ml. of distilled water are added 51 gm. of 6-[D-α-amino-(1,4-cyclohexadien-1 - yl)acetamido]penicillanic acid monohydrate. Then 12.0 gm. of potassium cyanate are added. While stirring, the mixture is heated to 80° in 4.5 minutes. The resulting clear solution is cooled in five minutes to 20°. After holding overnight at room temperature, the product precipitates upon adjusting the pH to 2.0 with 27 ml. of one-half concentrated HCl. The crystalline mixture is agitated for one-half hour, filtered and the cake is washed with 200 ml. of cold distilled water and dried to constant weight in vacuo at 30°.

EXAMPLE 8

A sterile powder for reconstitution for use intramuscularly is prepared from the following ingredients which supply 1000 vials each containing 250 mg. of active ingredient:

|  | Gm. |
| --- | --- |
| 6-[D-α-ureido-(1,4 - cyclohexadien - 1 - yl) - acetamido]penicillanic acid monohydrate, sterile | 250 |
| Lecithin powder, sterile | 50 |
| Sodium carboxymethylcellulose, sterile | 20 |

The sterile powders are aseptically blended and filled into sterile vials and sealed. The addition of 1 ml. of water for injection to the vial provides a suspension for intramuscular injection.

EXAMPLE 9

A preformed suspension is prepared from the following ingredients which supply 1000 vials each containing 300 mg. of active ingredient in 1 ml. of water for intramuscular injection:

|  | Gm. |
| --- | --- |
| 6-[D-2-ureido-3-(1,4-cyclohexadien - 1 - yl)propionamido]penicillanic acid, sterile | 300 |
| Lecithin, sterile | 60 |
| Sodium carboxymethylcellulose, sterile | 10 |
| Acetate buffer, sterile, pH 4.5 |  |
| Methyl paraben, sterile | 1.2 |
| Propyl paraben, sterile | 0.2 |
| Water for injection q.s., 1 liter. |  |

The parabens are dissolved in the acetate buffer and mixed with the water for injection. The lecithin and sodium carboxymethylcellulose are added and dissolved. The active compound is then added with stirring to make a homogeneous suspension. The suspension is filled into sterile vials each containing 1 ml., sealed and stored under refrigeration.

What is claimed is:

1. A compound of the formula

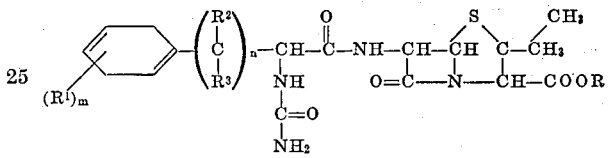

wherein R is hydrogen, lower alkyl, alkali metal, alkaline earth metal, lower alkylamine, dibenzylamine or N,N-dibenzylethylenediamine, R¹ is hydrogen, lower alkyl or lower alkoxy, R² and R³ each is hydrogen or lower alkyl, m is 1 or 2 and n is 0, 1, 2, 3 or 4.

2. A compound as in claim 1 wherein R is hydrogen or lower alkyl, R¹, R² and R³ each is hydrogen, m is 1 and n is 0.

3. A compound as in claim 2 wherein R is hydrogen.

4. A compound as in claim 1 wherein R is alkali metal, R¹, R² and R³ each is hydrogen, m is 1 and n is 0.

5. A compound as in claim 1 wherein R is hydrogen or lower alkyl, R¹, R² and R³ each is hydrogen, m and n each is 1.

6. A compound as in claim 1 wherein R is alkali metal, R¹, R² and R³ each is hydrogen, m and n each is 1.

References Cited

UNITED STATES PATENTS 3,485,819  12/1969  Weisenborn et al. ___ 260—239.1

FOREIGN PATENTS 746,904  7/1965  Canada _____ 260—239.1

NICHOLAS S. RIZZO, Primary Examiner

U.S. Cl. X.R.

424—271